(12) United States Patent
Schimpf

(10) Patent No.: US 10,006,496 B2
(45) Date of Patent: Jun. 26, 2018

(54) CLUTCH

(71) Applicant: Schaeffler Technologies AG & Co. KG, Herzogenaurach (DE)

(72) Inventor: Ralph Schimpf, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 22 days.

(21) Appl. No.: 15/248,363

(22) Filed: Aug. 26, 2016

(65) Prior Publication Data
US 2017/0058965 A1    Mar. 2, 2017

(30) Foreign Application Priority Data
Aug. 27, 2015  (DE) .................. 10 2015 216 366

(51) Int. Cl.
| | |
|---|---|
| *F16D 41/06* | (2006.01) |
| *F16D 13/26* | (2006.01) |
| *F16D 13/18* | (2006.01) |
| *F16D 13/28* | (2006.01) |
| *F16D 13/16* | (2006.01) |
| *F16D 13/68* | (2006.01) |
| *F16D 23/12* | (2006.01) |

(52) U.S. Cl.
CPC .............. *F16D 13/26* (2013.01); *F16D 13/18* (2013.01); *F16D 13/28* (2013.01); *F16D 13/16* (2013.01); *F16D 13/683* (2013.01); *F16D 2023/123* (2013.01)

(58) Field of Classification Search
CPC ...... F16D 41/061; F16D 13/18; F16D 41/063; F16D 2023/123; F16D 41/20; F16D 13/28
See application file for complete search history.

(56) References Cited

U.S. PATENT DOCUMENTS

2014/0332335 A1* 11/2014 Strong .................... F16D 41/06
192/43
2017/0058969 A1*  3/2017 Hartmann ............. F16D 41/061

FOREIGN PATENT DOCUMENTS

WO         2015015320         2/2015

* cited by examiner

*Primary Examiner* — Ramya P Burgess
*Assistant Examiner* — Lillian T Nguyen
(74) *Attorney, Agent, or Firm* — Volpe & Koenig, P.C.

(57) ABSTRACT

A friction clutch (1) with an inner ring (2) arranged about a rotary axis (d) and an outer ring (3) arranged coaxially in reference thereto, as well as an elastic intermediate ring (3) arranged between these two in a radially limited fashion, with the inner ring (2) and the intermediate ring (4) resting on each other via a ramp arrangement (9) arranged and acting bi-directionally in the circumferential direction. In order to embody the clutch (1) easily and cost-effectively, segments (13) pointing radially outwardly and arranged distributed over the perimeter form in connection with a radial displacement of the intermediate rings (4) relative to the outer ring (3) a positive connection (22) in the circumferential direction with the radial displacement of the intermediate ring (4) being provided with a ramp arrangement (12) effective in the axial direction and switched by an axial displacement of the inner ring (2) in reference to the intermediate ring (4).

6 Claims, 1 Drawing Sheet

CLUTCH

INCORPORATION BY REFERENCE

The following documents are incorporated herein by reference as if fully set forth: German Patent Application No. 102015216366.0, filed Aug. 27, 2015.

BACKGROUND

The invention relates to a clutch with an inner ring, arranged about a rotary axis, and an outer ring, arranged coaxially thereabout, as well as an elastic intermediate ring arranged between them and radially limited.

Generic clutches are known for example from WO 2015/015320 A2. Here, an inner ring is received on gears of a shaft in a torque-proof fashion, and has an exterior perimeter embodied in the form of a traverse, on which a clamping ring is arranged having a complementary inner perimeter. An axially displaceable control ring is arranged radially between the clamping ring and an outer ring, having a ramp arrangement axially effective in reference to the outer ring. In an axial displacement of the control ring in the direction of the inclining ramp of the ramp arrangement a clamping connection develops between the clamping ring, the control ring, and the outer ring, which is released by an opposite displacement of the control ring.

SUMMARY

The objective of the invention is the advantageous further development of a generic clutch. In particular, the clutch is embodied for easy use and comprising as few components as possible.

The objective is attained with a clutch having one or more features of the invention. Advantageous embodiments are described below and in the claims.

The present clutch comprises an inner ring arranged about a rotary axis and an outer ring arranged coaxially in reference thereto, as well as an elastic intermediate ring arranged between them and radially limited. In the simplest case, the clutch can therefore be embodied from three parts. The inner ring and the intermediate ring rest on each other via a ramp arrangement, arranged in the circumferential direction and bi-directionally acting upon them. Here, a moment can be transmitted between the intermediate ring and the inner ring in both directions of rotation. Segments are provided at the intermediate ring, pointing radially outwardly and arranged distributed over the circumference, which in case of a radial pre-stressing of the intermediate ring form a positive engagement with the outer ring in the circumferential direction.

The positive engagement is switched in that a radial displacement of the intermediate ring provided via a ramp arrangement, acting in the axial direction, by an axial displacement of the inner ring switched in reference to the intermediate ring. This means that the ramp arrangement is provided in the form of axially inclining ramps at the inner ring and at the intermediate ring, particularly at its segments. By an inner ring, displaced from the outside, for example by an actuator, oil pressure of a device surrounded with a pressure medium, a displacement of the inner ring depending on torque, for example due to a diagonally geared part or the like, the intermediate ring is radially displaced towards the outside at the axially inclining ramps such that the segments form with the inner perimeter of the outer ring, provided with a radial profile, a detachable, moment-transmitting positive connection, so that the clutch is effective between the inner ring and the outer ring. When returning the inner ring, the clutch is opened again, with here by the radial return of the intermediate ring a gap opening between the segments and the outer ring. By locating the ramp arrangement directly between the inner ring and the intermediate ring here any additional components can be avoided.

Sufficiently wide cut-outs may be provided between the segments in order to generate radial elasticity for the intermediate ring. Furthermore, for example recesses may be provided dividing the segments radially from the inside and/or cut-in radially from the outside. Radially inward and radially outward recesses may be embodied and arranged radially over top of each other and forming braces with lower cross-sections in reference to the cross-section of the intermediate ring at the segments, which connect the segments at least radially in an elastic fashion. In this regard, the bars serve as elastic elements like springs. Alternatively or additionally the intermediate ring may be slotted at one side, thus embodied open at one side, so that a radial displacement of the intermediate ring is facilitated, while forming an enlarged diameter.

In case of an elastic embodiment of the connection between the intermediate ring and the inner ring the intermediate ring may be embodied rotational to a limited extent along the ramp arrangement with inclining ramps at both sides in the circumferential direction, so that it is displaced radially outwardly under the influence of a moment at least slightly in reference to the inner ring and thus it can generate a positive engagement of the intermediate ring with the outer ring.

In order to hold the intermediate ring at the inner ring and thus to avoid any contact with the outer ring when the clutch is open, the intermediate ring may be pre-stressed in reference to the inner ring.

In order to form the positive connection, the segments may have radially at the outside recesses or notches aligned radially inwardly, which are formed complementarily to the cams embodied at the outer ring radially inwardly, for example formed in one piece or fastened thereat.

According to an advantageous embodiment the clutch may be embodied in a stepped form, acting initially in a force-fitting, and then in a form-fitting fashion. Here, for example via a radial displacement of the segments a clamping connection may be formed via an axial displacement of the inner ring and subsequently the form-fitting connection can be generated by the cams of the outer ring sliding into the recesses of the intermediate ring.

It is understood that in the inverse embodiment, in order to form the positive connection, the cams can be provided at the intermediate ring and complementary to the cams, at the inner circumference of the outer ring, radially outwardly inserted, for example embossed pockets may be provided.

According to an advantageous embodiment the clutch includes a friction clutch, in addition to the switchable, detachable connection, radially inside the inner ring. The friction clutch is for example embodied as a wet-running friction clutch, which has an input part and an output part, with blades being allocated to the input part and the output part, respectively alternating laminated, with the blades under pressure forming a friction-fitting connection.

According to an advantageous embodiment the inner ring may form a blade carrier for the blades of the input or the output part. For this purpose, an inner profile like inner gears is provided at the input part, with the blades being suspended therein in a torque-proof fashion. The outer profiling with the bi-directional ramps embodied in the circumferential direction and the inner profile can be embodied during the production of the inner ring, waiving any additional tools.

In other words, a particularly easily produced clutch without any classic gears is suggested. The blocking between the inner ring and the outer ring is preferably performed by a positive connection in the radial direction. This allows a simple and cost-effective production as well as low stress. Simple production can be ensured by the use of sheet-metal parts.

Furthermore, a single-track method, such as synchronization according to gears, is not necessary, here.

The invention may have the following advantageous features with this list not being conclusive.
- Activating the clutch via an axial displacement of the inner ring and radial expansion of the intermediate ring (wedge plate),
- Ramps at both sides between the intermediate ring and the inner ring allocated in the circumferential direction (push and pull-operation),
- Axial ramp arrangement in order to generate a clamping contact at the outer diameter of the intermediate ring and a groove of the outer ring,
- Positive connection between the intermediate ring and the outer ring,
- In the deactivated state, no contact between the intermediate ring and the outer ring,
- The intermediate ring is radially pre-stressed on the inner ramps of the inner ring.

The inner ring may have at the inner diameter a gearing for the inner blades of a wet-running clutch. Furthermore, bi-directional ramps are provided at the inner ring for the pull and push-operation of the clutch, mounted at the outer perimeter of the inner ring in the circumferential direction. Furthermore, the outer diameter of the inner ring has an incline in the axial direction. This incline is preferably greater than the switching limit of the positive connection between the intermediate ring and the outer ring.

The intermediate ring shows at the inner circumference bi-directional ramps in the circumferential direction for the push and pull-operation. Furthermore, here an incline is provided in the axial direction at the segments, complementary to the incline of the inner ring. A positive contact is given at the outer diameter in reference to the outer ring, for example via cams of the outer ring distributed over the perimeter and expanded radially inwardly.

The outer ring may be equipped with a profile at the inner perimeter, acting radially inwardly. A form-fitting connection may be provided at the outer perimeter, for example gears to connect the outer ring with a housing or the like.

In the non-switched state of the clutch, the intermediate ring is placed in a pre-stressed state on the inner ring and has with its outer perimeter no contact to the outer ring and/or its profile. The pre-stressing is facilitated by dividing the intermediate ring.

In order to shift the clutch, the inner ring is axially displaced so that the intermediate ring widens and generates a contact to the outer ring. By this contact a positive connection develops, which is embodied by a radial displacement of the segments via a gliding process of the intermediate ring along the ramps at the inner ring with another enlargement of the diameter of the intermediate ring and thus leads to a form-fitting connection between the inner ring and the outer ring. Now the clutch is closed.

BRIEF DESCRIPTION OF THE DRAWINGS

The invention is explained in greater detail based on the exemplary embodiment shown in FIGS. 1 and 2. Shown are.

DETAILED DESCRIPTION OF THE PREFERRED EMBODIMENTS

Figure 1:
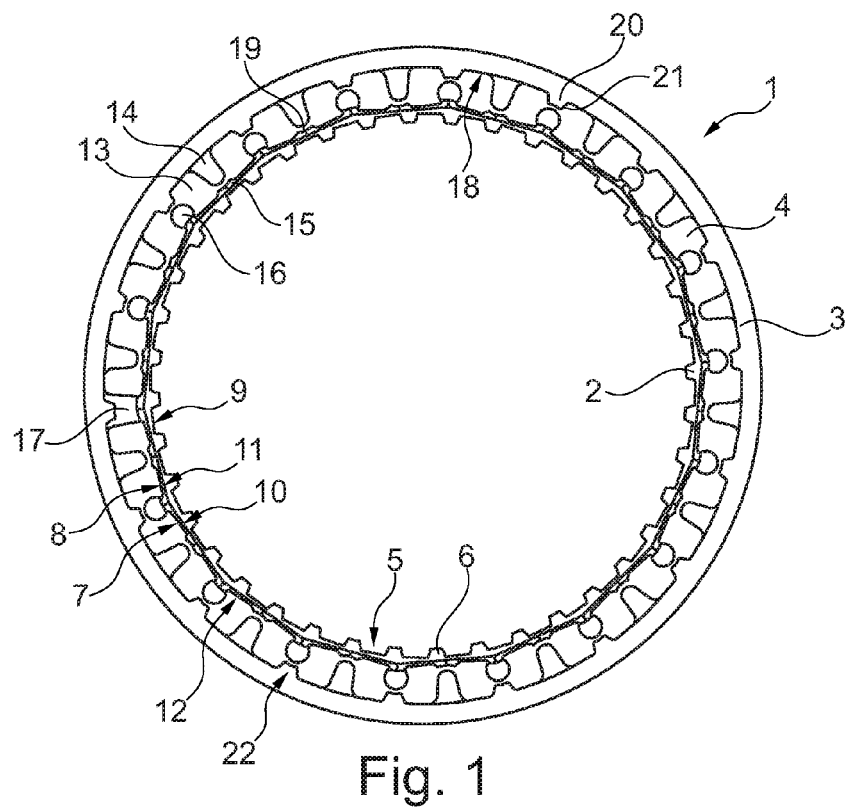
FIG. 1 a view of the clutch arranged about a rotary axis.

FIG. 1 shows the clutch 1 arranged about the rotary axis b in a front view. The clutch 1 comprises the inner ring 2 and the outer ring 3 as well as the intermediate ring 4 arranged therebetween. The inner ring 2 has at its inner perimeter 5 the inner gears 6 for receiving blades of a wet-running friction clutch. In this regard, the inner ring serves as the blade carrier like the outer blade carrier.

The inner ring 2 comprises at its outer perimeter inclining ramps 7, 8, arranged distributed over the circumference and alternating in both circumferential directions, at which ramps 10, 11 are received, forming the ramp arrangement 9 of the intermediate ring 4 via ramps 7, 8 embodied complementarily thereto. In a manner not shown, additionally a ramp arrangement 12 with axial ramps is arranged, shown in FIG. 2, between the inner ring 2 and the intermediate ring 4.

The intermediate ring 4 has segments 13, arranged widened radially outwardly and distributed over the circumference, which are separated from each other via recesses 14, 15, 16 entered radially from the inside and radially from the outside, and thus allow a radial displacement of the intermediate ring 4 while widening the recesses 14, 15, 16. Here, the bars 19 between the segments 13 serve as elastic elements. Additionally, the intermediate ring 4 is opened unilaterally via the penetration 17. The intermediate ring 4 is received on the inner ring 2, radially pre-stressed. Depending on the switching state of the clutch 1, the segments 13 come into a positive contact with the inner perimeter 18 of the outer ring 3.

The outer ring 3 can be connected in a manner not shown at its outer perimeter to a housing or the like in a form-fitting or friction-fitting fashion, or by material-to-material bonding.

In order to form the active positive connection 22 shown here the cams 20 arranged distributed over the perimeter at the outer ring 3 engage radially the recesses 21 in the segments 13.

Figure 2:
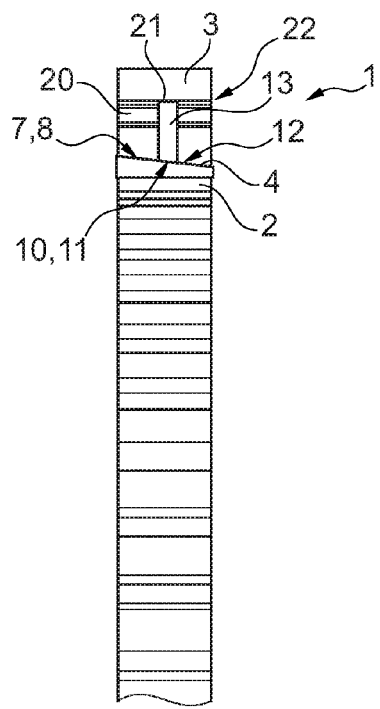
FIG. 2 the top part of the clutch in a cross-section.

FIG. 2 shows the clutch 1 of FIG. 1 in a cross-sectional detail with the inner ring 2, the outer ring 3, and the intermediate ring 4. FIG. 2 illustrates the embodiment of the ramp arrangement 12. The ramps 7, 8 of the inner ring 2 and the ramps 10, 11 of the intermediate ring 4 and/or the segments 13 complementary thereto are embodied as axially inclined ramps. The cams 20 engage the recesses 21 of the segments 13 to generate the positive connection 22.

Based on the combined analysis of FIGS. 1 and 2 the function of the clutch 1 is explained. When the clutch 1 is opened, the intermediate ring 4 is radially pre-stressed on the inner ring 2 without any displacement of the ramps 7, 8, 10, 11 in reference to each other. This way a radial gap forms between the segments 13 and the outer ring 3 and/or the cams 20, so that no moment is transmitted.

In order to actuate the clutch, the inner ring 2 is displaced in reference to the outer ring 3 axially for example via an actuator, a pressure piston, or the like. This way via the ramp arrangement 12, the segments 13 are displaced radially outwardly at the ramps 7, 8, 10, 11 such that the segments 13 engage the cams 20 in a friction-fitting fashion. By the different rotation of the inner ring 2 and the outer ring 3 the intermediate ring 4 is delayed or accelerated in reference to the inner ring causing a relative rotation of the ramp arrangement 9 with the inclines of the ramps 7, 8, 10, 11 arranged in the circumferential direction and thus a relative rotation of the intermediate ring 4 in reference to the inner ring 2. This way, the segments 13 are further distorted in reference to the cams 20 until the cams 20 latch radially pre-stressed in the recesses 21.

In order to again open the clutch 1 the inner ring 2 is displaced in the opposite direction of the axial inclines of the ramps 7, 8, 10, 11. This way, the pre-stressing of the segments 13 is reduced in reference to the cams 20 and the intermediate ring 4 rotates under its pre-stressing force on the inner ring 2 and under releasing of the positive connection 22 between the cams and the recesses 21 into its original position, so that the force-fitting connection of the segments 13 at the outer ring 3 is released again.

LIST OF REFERENCE CHARACTERS

1 Clutch
2 Inner ring
3 Outer ring
4 Intermediate ring
5 Inner circumference
6 Inner gear
7 Ramp
8 Ramp
9 Ramp arrangement
10 Ramp
11 Ramp
12 Ramp arrangement
13 Segment
14 Recess
15 Recess
16 Recess
17 Penetration
18 Inner circumference
19 Bar
20 Cam
21 Recess
22 Positive connection
d rotary axis

The invention claimed is:

1. A clutch comprising an inner ring arranged about a rotary axis (d) and an outer ring arranged coaxially relative to the inner ring, an elastic intermediate ring arranged between the inner ring and the outer ring and limited therebetween in a radial direction, the inner ring and the intermediate ring rest on each other via a ramp arrangement located bi-directionally effective in a circumferential direction, the intermediate ring including segments pointing outwardly and arranged distributed over a circumference of the intermediate ring to form a positive connection between the intermediate ring and the outer ring, a radial displacement of the intermediate ring being provided via the ramp arrangement by an axial displacement of the inner ring relative to the intermediate ring, the segments include recesses forming the positive connection and the outer ring includes radially inwardly extending cams, and the recesses are complementary to the radially inwardly extending cams.

2. The clutch according to claim 1, wherein the intermediate ring is embodied unilaterally open.

3. The clutch according to claim 1, wherein the segments are separated from each other via radially outer recesses extending radially inwardly.

4. The clutch according to claim 3, wherein the segments are separated from each other via radially inner recesses cut-in radially from an inner side.

5. The clutch according to claim 4, wherein the radially inner recesses and radially outer recesses are arranged on a same circumference.

6. The clutch according to claim 5, wherein a bar embodied between and by the radially inner recesses and radially outer recesses forms an elastic element arranged between the segments.

\* \* \* \* \*